United States Patent
Wang et al.

(10) Patent No.: US 11,448,556 B2
(45) Date of Patent: Sep. 20, 2022

(54) TEMPERATURE SENSING DEVICE AND TEMPERATURE SENSING METHOD

(71) Applicants: Global Unichip Corporation, Hsinchu (TW); Taiwan Semiconductor Manufacturing Co., Ltd., Hsinchu (TW)

(72) Inventors: Ting-Hao Wang, Hsinchu (TW); Hsiang-Wei Liu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 178 days.

(21) Appl. No.: 16/996,908

(22) Filed: Aug. 19, 2020

(65) Prior Publication Data

US 2021/0381904 A1  Dec. 9, 2021

(30) Foreign Application Priority Data

Jun. 8, 2020  (TW) .................................. 109119150

(51) Int. Cl.
*G01K 3/04*  (2006.01)
*G01K 7/42*  (2006.01)
(Continued)

(52) U.S. Cl.
CPC ............... *G01K 3/04* (2013.01); *G01K 1/026* (2013.01); *G01K 7/01* (2013.01); *G01K 7/42* (2013.01); *G01K 2219/00* (2013.01)

(58) Field of Classification Search
CPC ............ G01K 3/04; G01K 1/026; G01K 7/01; G01K 7/42; G01K 7/00
See application file for complete search history.

(56) References Cited

U.S. PATENT DOCUMENTS

| 4,448,545 A | * | 5/1984 | Pelka | ...................... G01K 17/08 374/E17.008 |
| 5,206,650 A | * | 4/1993 | Parle | ...................... H03M 1/38 341/163 |

(Continued)

FOREIGN PATENT DOCUMENTS

| DE | 102009060298 | 8/2014 |
| TW | I460409 | 11/2014 |

(Continued)

OTHER PUBLICATIONS

Office Action of Taiwan Counterpart Application, dated Jan. 7, 2021, pp. 1-3.

*Primary Examiner* — Nathaniel T Woodward
*Assistant Examiner* — Philip L Cotey
(74) *Attorney, Agent, or Firm* — JCIPRNET

(57) ABSTRACT

A temperature sensing device and a temperature sensing method are provided. The temperature sensing device includes a sensor and an analog-to-digital converter. The sensor generates a first sensing result corresponding to an ambient temperature based on a first condition and generates a second sensing result corresponding to the ambient temperature based on a second condition. The second sensing result is different from the first sensing result. The analog-to-digital divides the first sensing result and the second sensing result to obtain a quotient value and generates an output digital code value corresponding to the ambient temperature according to the quotient value.

10 Claims, 8 Drawing Sheets

(51) Int. Cl.
*G01K 1/02* (2021.01)
*G01K 7/01* (2006.01)

(56) References Cited

U.S. PATENT DOCUMENTS

| | | | | |
|---|---|---|---|---|
| 7,427,158 | B2* | 9/2008 | Yoshida | G01K 3/005 |
| | | | | 374/170 |
| 7,676,340 | B2* | 3/2010 | Yasui | G01C 17/38 |
| | | | | 365/211 |
| 9,389,126 | B2* | 7/2016 | Kim | G01K 7/00 |
| 9,880,060 | B2* | 1/2018 | Cho | G01K 7/01 |
| 10,190,918 | B2* | 1/2019 | Higuchi | G01C 19/5776 |
| 10,254,179 | B2* | 4/2019 | Ishii | G01K 7/42 |
| 10,473,530 | B2* | 11/2019 | Fan | G04F 10/005 |
| 10,642,305 | B2* | 5/2020 | Lee | G05F 3/30 |
| 11,125,627 | B2* | 9/2021 | Jenkner | G01K 7/01 |
| 2002/0014675 | A1* | 2/2002 | Matsumoto | G01K 7/01 |
| | | | | 257/470 |
| 2006/0153277 | A1* | 7/2006 | Yoshida | G01K 3/005 |
| | | | | 374/178 |
| 2009/0154279 | A1* | 6/2009 | Hong | G01K 7/00 |
| | | | | 374/170 |
| 2010/0164552 | A1* | 7/2010 | Luria | G01K 7/01 |
| | | | | 377/55 |
| 2013/0218512 | A1* | 8/2013 | Kim | G01K 7/00 |
| | | | | 702/130 |
| 2014/0086279 | A1* | 3/2014 | Cao | G01K 1/026 |
| | | | | 374/183 |
| 2015/0330841 | A1* | 11/2015 | Kern | H05K 7/20209 |
| | | | | 702/136 |
| 2018/0252522 | A1* | 9/2018 | Dormody | G01K 7/00 |
| 2018/0252594 | A1* | 9/2018 | Jenkner | G01K 15/00 |
| 2019/0324490 | A1* | 10/2019 | Bass | G05F 3/30 |

FOREIGN PATENT DOCUMENTS

| | | |
|---|---|---|
| TW | 201538940 | 10/2015 |
| TW | 201602531 | 1/2016 |
| TW | I651519 | 2/2019 |

* cited by examiner

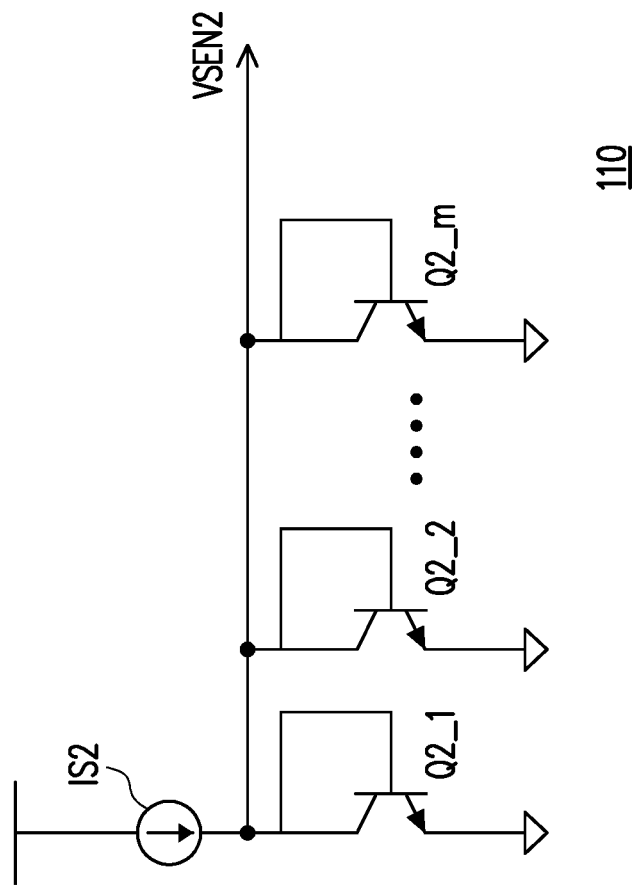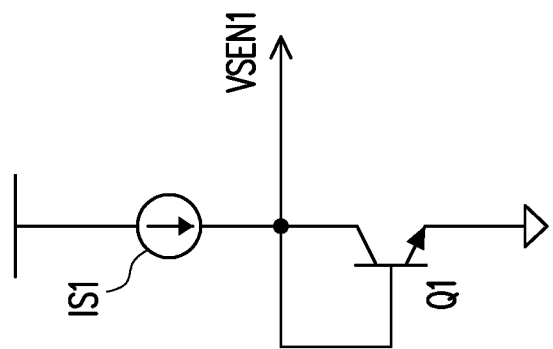
FIG. 3

TEMPERATURE SENSING DEVICE AND TEMPERATURE SENSING METHOD

CROSS-REFERENCE TO RELATED APPLICATION

This application claims the priority benefit of Taiwan application serial no. 109119150, filed on Jun. 8, 2020. The entirety of the above-mentioned patent application is hereby incorporated by reference herein and made a part of this specification.

BACKGROUND

1. Technical Field

The disclosure relates to a temperature sensing device and a temperature sensing method, and in particular, to a temperature sensing device and a temperature sensing method with high accuracy.

2. Description of Related Art

Generally speaking, a temperature sensing device senses the temperature through a sensor, so as to generate a single analog signal corresponding to the temperature. The analog signal is converted to a digital signal through a conversion circuit. However, the above method may cause the digital signal to be offset due to the voltage variation of a power source received by the conversion circuit. In order to improve the offset of the digital signal, the Taiwan patent no. 1460409 discloses eliminating the voltage variation through a temperature correction unit. However, the above correction method may increase the design complexity of the temperature sensing device.

SUMMARY

The disclosure provides a temperature sensing device and a temperature sensing method, which may improve sensing accuracy of the temperature sensing device and decrease complexity of temperature sensing.

The temperature sensing device provided by the disclosure includes a sensor and an analog-to-digital converter. The sensor is configured to generate a first sensing result corresponding to an ambient temperature based on a first condition and generate a second sensing result corresponding to the ambient temperature based on a second condition different from the first condition. The first sensing result is different from the second sensing result. The analog-to-digital converter is coupled to the sensor. The analog-to-digital converter is configured to divide the first sensing result and the second sensing result to obtain a quotient value and generate an output digital code value corresponding to the ambient temperature according to the quotient value.

The temperature sensing method provided by the disclosure includes the following steps. A first sensing result is generated corresponding to an ambient temperature based on a first condition. A second sensing result is generated corresponding to the ambient temperature based on a second condition different from the first condition. The first sensing result is different from the second sensing result. Division is performed on the first sensing result and the second sensing result to obtain a quotient value. An output digital code value is generated corresponding to the ambient temperature according to the quotient value.

Based on the above, in the disclosure, the sensor provides the first sensing result and the second sensing result in response to the ambient temperature. Since the first sensing result is different from the second sensing result, the voltage variation of the power source may be eliminated through the division operation, and the temperature sensing accuracy is thereby improved in the disclosure. In addition, no additional temperature correction means is needed in the disclosure. Therefore, the complexity of temperature sensing may be decreased.

To make the features and advantages of the disclosure clear and easy to understand, the following gives a detailed description of embodiments with reference to accompanying drawings.

BRIEF DESCRIPTION OF THE DRAWINGS

FIG. 3 is a schematic circuit diagram of a sensor according to one embodiment of the disclosure.

DESCRIPTION OF THE EMBODIMENTS

Some embodiments of the disclosure are described below in detail in conjunction with the drawings. For component reference symbols referenced in the following description, components with the same component reference symbols in different drawings are regarded as the same or similar components. These embodiments are only a part of the disclosure and do not disclose all the embodiments of the disclosure. More precisely, these embodiments are only examples of devices and methods in the scope of patent application of the disclosure.

Figure 1:
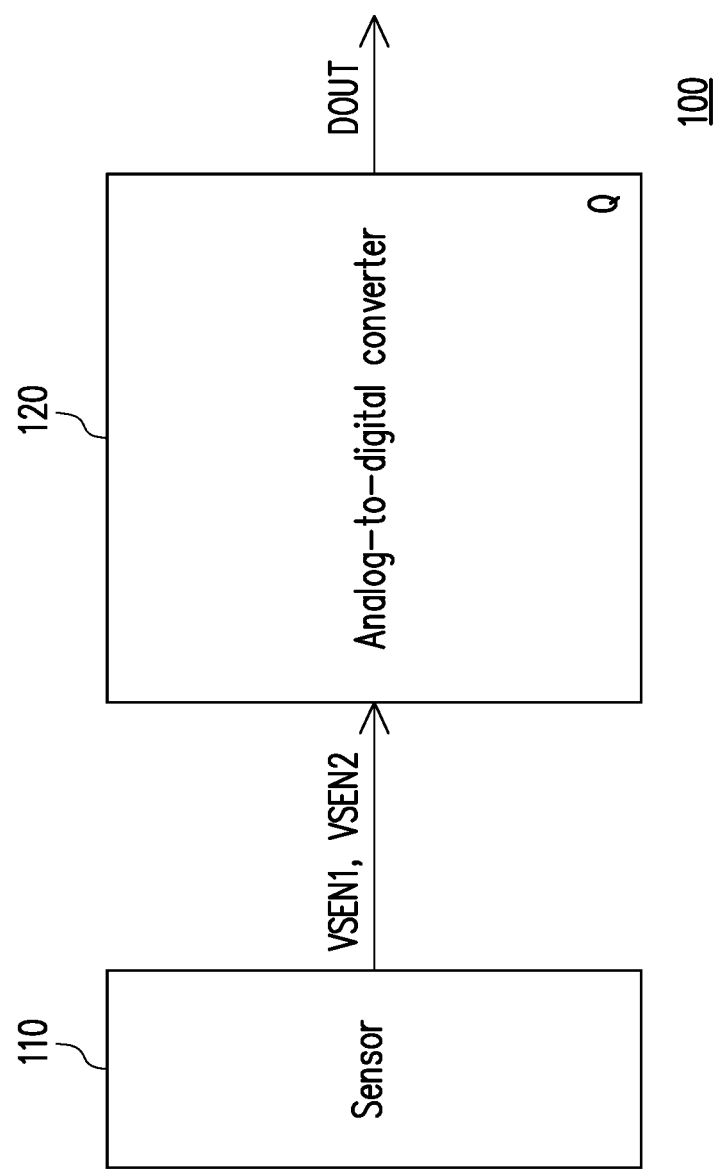
FIG. 1 is a schematic device diagram of a temperature sensing device according to Embodiment 1 of the disclosure.

With reference to FIG. 1, FIG. 1 is a schematic device diagram of a temperature sensing device according to Embodiment 1 of the disclosure. In the present embodiment, a temperature sensing device 100 includes a sensor 110 and an analog-to-digital converter 120. The sensor 110 generates a first sensing result VSEN1 corresponding to an ambient temperature based on a first condition. The sensor 110 further generates a second sensing result VSEN2 corresponding to the ambient temperature based on a second condition. In the present embodiment, the first sensing result VSEN1 and the second sensing result VSEN2 are respectively analog voltage signals. However, the disclosure is not limited thereto. In some embodiments, the first sensing result VSEN1 and the second sensing result VSEN2 are respectively analog current signals. In the present embodiment, the first condition is different from the second condition, and thus, the first sensing result is different from the second sensing result. For example, the first condition and the second condition are first sensing sensitivity and second sensing sensitivity of the sensor 110, respectively. The first sensing sensitivity of the sensor 110 is designed to be different from the second sensing sensitivity. For example, the sensing sensitivity of the first condition is designed to be greater than that of the second condition. For another example, the sensing sensitivity of the first condition is designed to be less than the sensing sensitivity of the second condition. The analog-to-digital converter 120 is coupled to the sensor 110 to receive the first sensing result VSEN1 and the second sensing result VSEN2. The analog-to-digital converter 120 divides the first sensing result VSEN1 and the second sensing result VSEN2 to obtain a quotient value Q and generates an output digital code value DOUT corresponding to the ambient temperature according to the quotient value Q.

It is worth mentioning herein that, the temperature sensing device 100 provides a first sensing result VSEN1 corresponding to an ambient temperature based on a first condition and provides a second sensing result VSEN2 corresponding to the ambient temperature based on a second condition through the sensor 110. Since the first condition is different from the second condition, in the disclosure, the voltage variation of the power source may be eliminated through a division operation to generate an output digital code value DOUT corresponding to the ambient temperature. Therefore, the sensing accuracy of the temperature sensing device 100 may be improved. In addition, the temperature sensing device 100 needs no additional temperature correction means. Therefore, the design complexity of the temperature sensing device 100 may be decreased.

Figure 2:
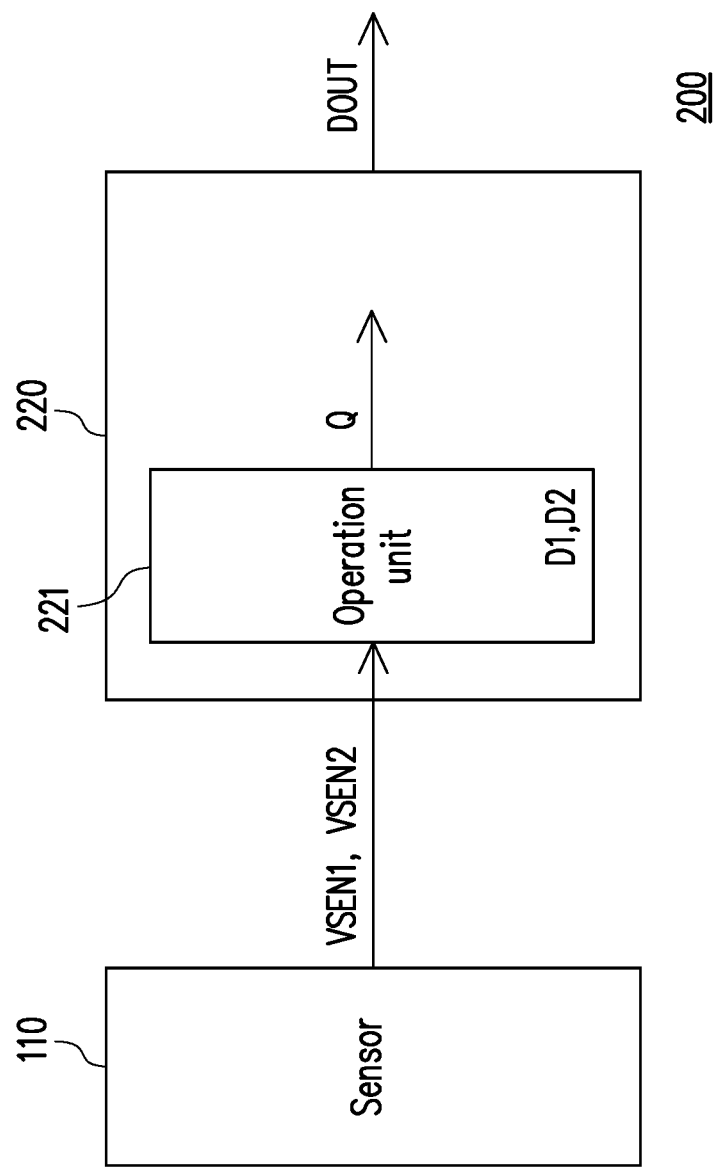
FIG. 2 is a schematic device diagram of a temperature sensing device according to Embodiment 2 of the disclosure.

With reference to FIG. 2, FIG. 2 is a schematic device diagram of a temperature sensing device according to Embodiment 2 of the disclosure. In the present embodiment, a temperature sensing device 200 includes a sensor 110 and an analog-to-digital converter 220. The analog-to-digital converter 220 includes an operation unit 221. The operation unit 221 is coupled to the sensor 110. The operation unit 221 receives a first sensing result VSEN1 and a second sensing result VSEN2 from the sensor 110. The operation unit 221 converts the first sensing result VSEN1 to a first digital code value D1 and converts the second sensing result VSEN2 to a second digital code value D2. The operation unit 221 divides the first digital code value D1 and the second digital code value D2 to obtain a quotient value Q.

In the present embodiment, the operation unit 221 may convert the first sensing result VSEN1 to the first digital code value D1 based on a peak reference voltage value (e.g., VREFP) inside the analog-to-digital converter 220, and convert the second sensing result VSEN2 to the second digital code value D2. For example, the operation unit 221 may convert the first sensing result VSEN1 to the first digital code value D1 according to formula (1) and convert the second sensing result VSEN2 to the second digital code value D2 according to formula (2).

$$D1 = VSEN1/(VREFP \pm \Delta V) \times 2^n \quad \text{Formula (1)}$$

$$D2 = VSEN2/(VREFP \pm \Delta V) \times 2^n \quad \text{Formula (2)}$$

Where n is equal to the number of bits of the analog-to-digital converter 220. It should be noted that the peak reference voltage value may be varied due to the difference of the ambient temperature or process (i.e., $\pm \Delta V$), such that the first digital code value D1 and the second digital code value D2 may be offset. Therefore, the operation unit 221 divides the first digital code value D1 and the second digital code value D2 according to formula (3) to obtain the quotient value Q. In formula (3), the quotient value Q is an operation result of dividing the first digital code value D1 by the second digital code value D2. In some embodiments, the quotient value Q may be an operation result of dividing the second digital code value D2 by the first digital code value D1.

$$Q = \frac{D1}{D2} = \frac{VSEN1/(VREFP \pm \Delta V) \times 2^n}{VSEN2/(VREFP \pm \Delta V) \times 2^n} = \frac{VSEN1}{VSEN2} \quad \text{Formula (3)}$$

It is worth mentioning herein that, through the operation according to formula (3), the operation unit 221 may remove the peak reference voltage value and the variation of the peak reference voltage value (i.e., VREFP$\pm \Delta V$). In this way, the sensing accuracy of the temperature sensing device 200 may be improved. In addition, the temperature sensing device 200 needs no additional temperature correction means. Therefore, the design complexity of the temperature sensing device 200 may be decreased.

With reference to FIG. 1 and FIG. 3 together, FIG. 3 is a schematic circuit diagram of a sensor according to one embodiment of the disclosure. In the present embodiment, the sensor 110 includes a first current source IS1 and a first bipolar transistor Q1. A base of the first bipolar transistor Q1 is coupled to a collector of the first bipolar transistor Q1, the analog-to-digital converter 120 and the first current source IS1. An emitter of the first bipolar transistor Q1 is coupled to a reference low potential (for example, ground). In the present embodiment, the sensor 110 may provide the first condition through the configuration of the first current source IS1 and the first bipolar transistor Q1. The base and the collector of the first bipolar transistor Q1 are both used as a first output end of the sensor 110. The sensor 110 provides the first sensing result VSEN1 to the analog-to-digital converter 120 through the first output end. In the present embodiment, the first bipolar transistor Q1 is implemented by an NPN bipolar transistor.

In some embodiments, the first bipolar transistor Q1 may be replaced by a diode. For example, an anode of the diode is coupled to the first current source IS1 and the analog-to-digital converter 120. The anode of the diode is used as the first output end of the sensor 110. A cathode of the diode is coupled to the reference low potential.

In some embodiments, the first bipolar transistor Q1 may be replaced by any N-type field-effect transistor. For example, a gate of the N-type field-effect transistor is coupled to a drain of the N-type field-effect transistor, the first current source IS1, and the analog-to-digital converter 120. The gate and the drain of the N-type field-effect transistor are both used as the first output end of the sensor 110. A source of the N-type field-effect transistor is coupled to the reference low potential.

In the present embodiment, the sensor 110 further includes a second current source IS2 and second bipolar transistors Q2_1 to Q2_m. A base of the second bipolar transistor Q2_1 is coupled to a collector of the second bipolar transistor Q2_1, the analog-to-digital converter 120 and the second current source IS2. An emitter of the second bipolar transistor Q2_1 is coupled to the reference low potential. A base of the second bipolar transistor Q2_2 is coupled to a collector of the second bipolar transistor Q2_2, the analog-to-digital converter 120 and the second current source IS2. An emitter of the second bipolar transistor Q2_2 is coupled to the reference low potential, and so on. In other words, the second bipolar transistors Q2_1 to Q2_m are connected in a diode-connected manner, and are connected in parallel with each other. In the present embodiment, the sensor 110 may provide the second condition different from the first condition through the configuration of the second current source IS2 and the second bipolar transistors Q2_1 to Q2_m.

The bases and the collectors of the second bipolar transistor Q2_1 to Q2_m are both used as a second output end of the sensor 110. The sensor 110 provides the second sensing result VSEN2 to the analog-to-digital converter 120 through the second output end. In the present embodiment, the second bipolar transistors Q2_1 to Q2_m are respectively implemented by NPN bipolar transistors.

In some embodiments, the second bipolar transistors Q2_1 to Q2_m may be replaced by diodes, respectively. For example, anodes of a plurality of diodes are coupled to the first current source IS1 and the analog-to-digital converter 120 together. The anodes of the plurality of diodes are used as the second output end of the sensor 110 together. Cathodes of the plurality of diodes are coupled to the reference low potential together.

In some embodiments, the second bipolar transistors Q2_1 to Q2_m may be replaced by any N-type field-effect transistors. For example, gates of a plurality of N-type field-effect transistors are respectively coupled to drains of the plurality of N-type field-effect transistors, the first current source IS1 and the analog-to-digital converter 120. The gates and the drains of the plurality of N-type field-effect transistors are both used as the second output end of the sensor 110. Sources of the plurality of N-type field-effect transistors are coupled to the reference low potential.

For the sake of convenience in description, the number of the first bipolar transistor Q1 in the present embodiment is one. The number of the first bipolar transistors in the disclosure may be multiple, and the number of the first bipolar transistors is less than the number of the second bipolar transistors. The number of the first bipolar transistors in the disclosure is not limited to the present embodiment.

Figure 4:
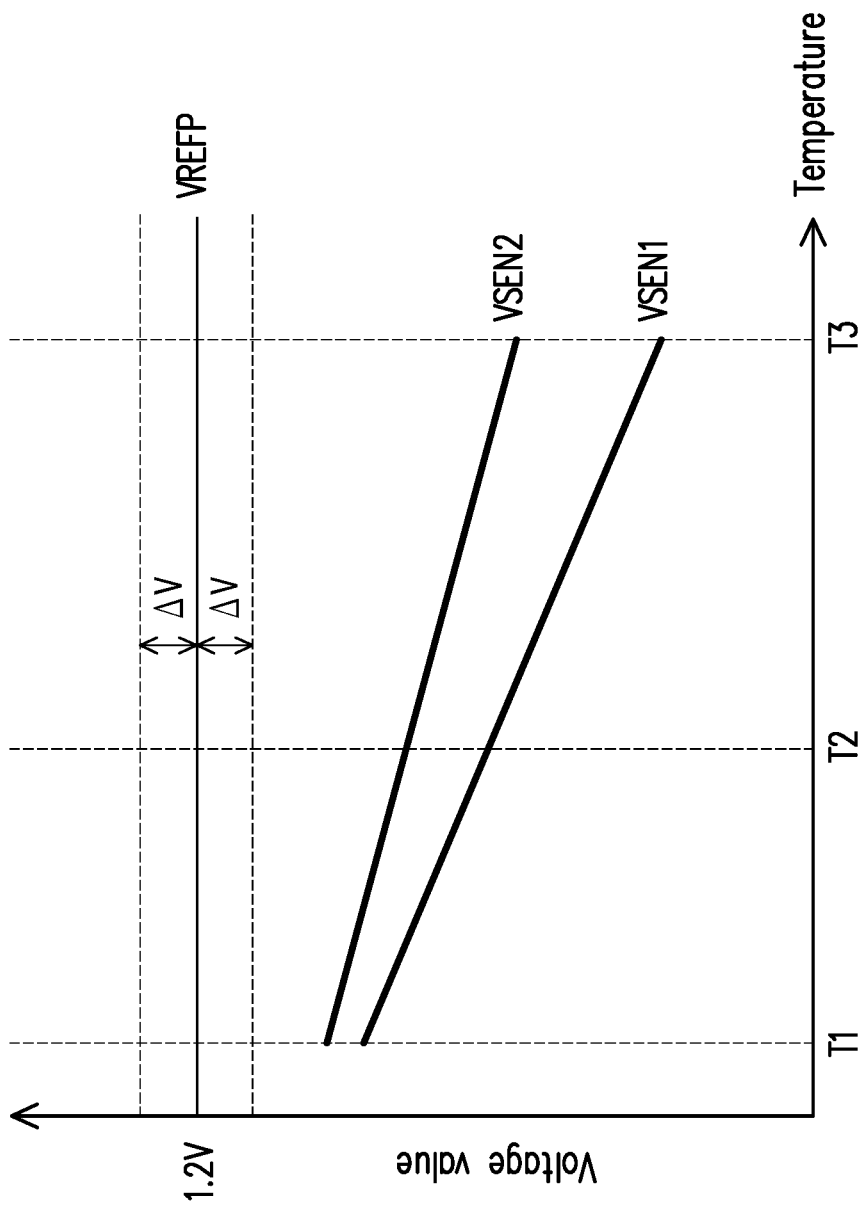
FIG. 4 is a temperature trend chart of a first sensing result, a second sensing result, and a peak reference value according to one embodiment of the disclosure.

With reference to FIG. 2, FIG. 3, and FIG. 4 together, FIG. 4 is a temperature trend chart of a first sensing result, a second sensing result and a peak reference value according to one embodiment of the disclosure. The peak reference voltage value VREFP in the analog-to-digital converter 220 may be varied due to the difference of the ambient temperature or process (i.e., $\pm\Delta V$). Based on the design in FIG. 3, the first sensing result VSEN1 and the second sensing result VSEN2 may decrease with the increase of temperature. In addition, the variation amount of the first sensing result VSEN1 is greater than the variation amount of the second sensing result VSEN2 (the disclosure is not limited thereto). Accordingly, it can be seen that based on the design in FIG. 3, the variation amount of the first sensing result VSEN1 may be greater than that of the second sensing result VSEN2. For example, at an ambient temperature T1, a difference corresponding to the ambient temperature T1 is generated between the second sensing result VSEN2 and the first sensing result VSEN1. At an ambient temperature T2, a difference corresponding to the ambient temperature T2 is generated between the second sensing result VSEN2 and the first sensing result VSEN1. At an ambient temperature T3, a difference corresponding to the ambient temperature T3 is generated between the second sensing result VSEN2 and the first sensing result VSEN1. The differences corresponding to the ambient temperature T1, T2, and T3 are different from one another (for example, the difference corresponding to the ambient temperature T3>the difference corresponding to the ambient temperature T2>the difference corresponding to the ambient temperature T1). Therefore, the operation unit 221 of the analog-to-digital converter 220 may obtain the quotient value Q related to the ambient temperature T1, T2, and T3 through a division operation. Since the peak reference voltage value VREFP and the variation of the peak reference voltage value VREFP (i.e., VREFP$\pm\Delta V$) are removed from the quotient value Q, the quotient value Q does not be offset due to the influence of the peak reference voltage value VREFP.

In the present embodiment, a current value provided by the first current source IS1 may be greater than a current value provided by the second current source IS2. In this way, the variation amount of the first sensing result VSEN1 is much greater than that of the second sensing result VSEN2, so as to improve the recognition effect of the temperature sensing device 200 on the ambient temperature T1, T2, and T3.

Figure 5:
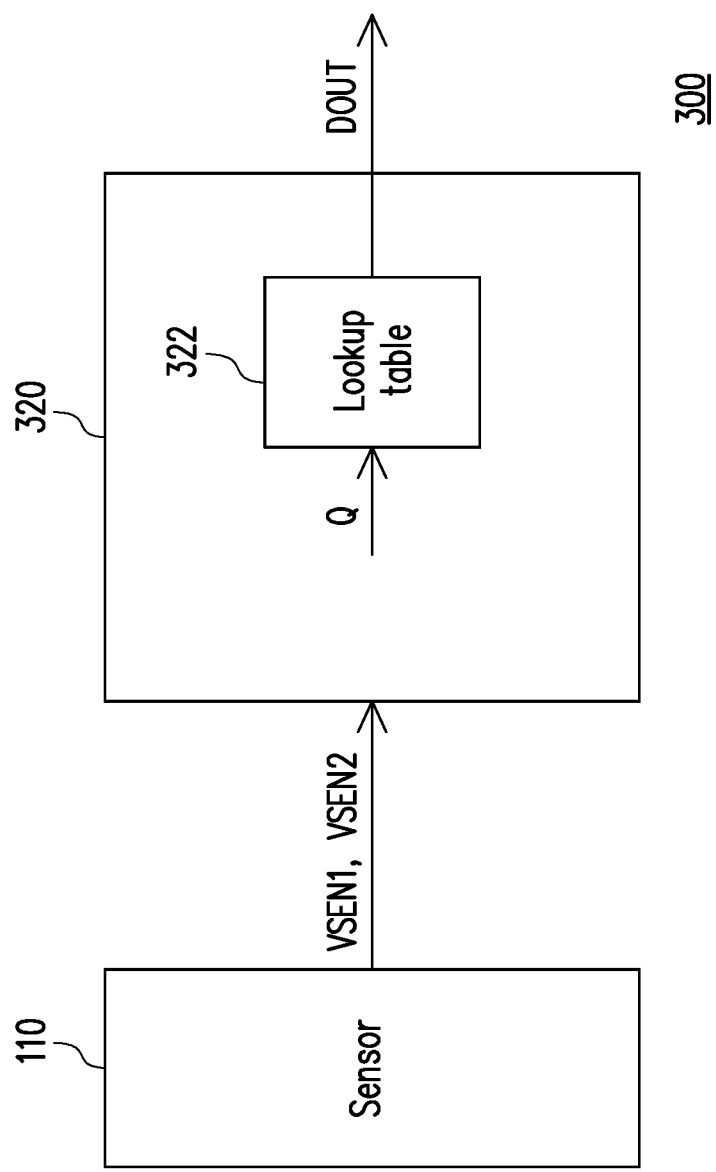
FIG. 5 is a schematic device diagram of a temperature sensing device according to Embodiment 3 of the disclosure.
Figure 6:
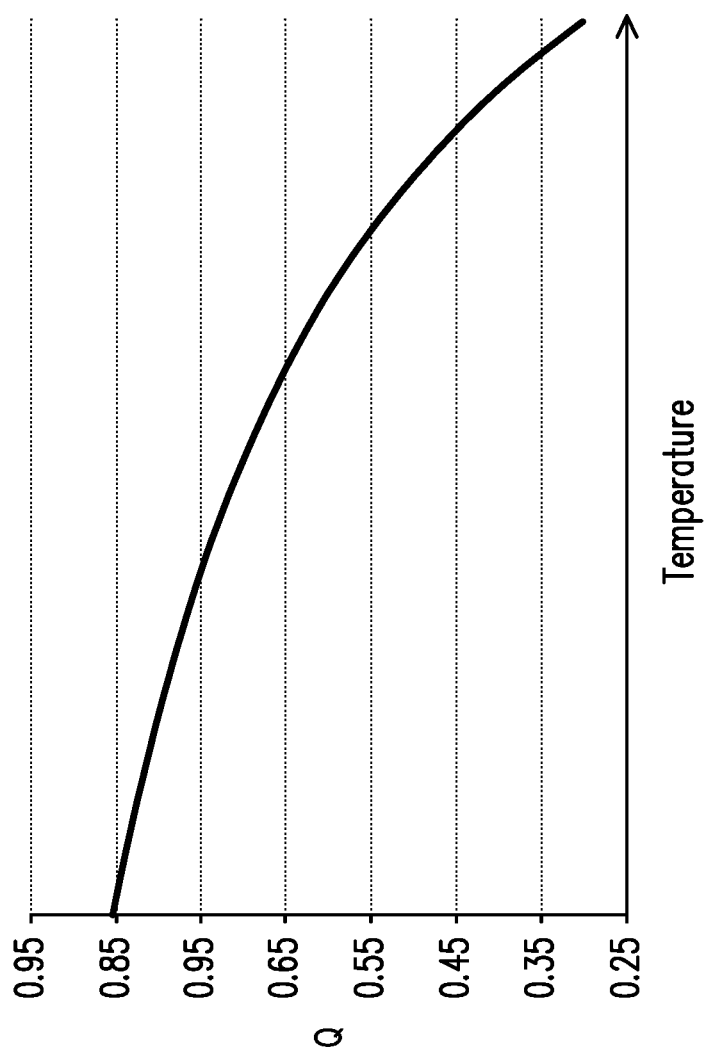
FIG. 6 is a relationship chart of quotient values and temperature values according to one embodiment of the disclosure.
Figure 7:
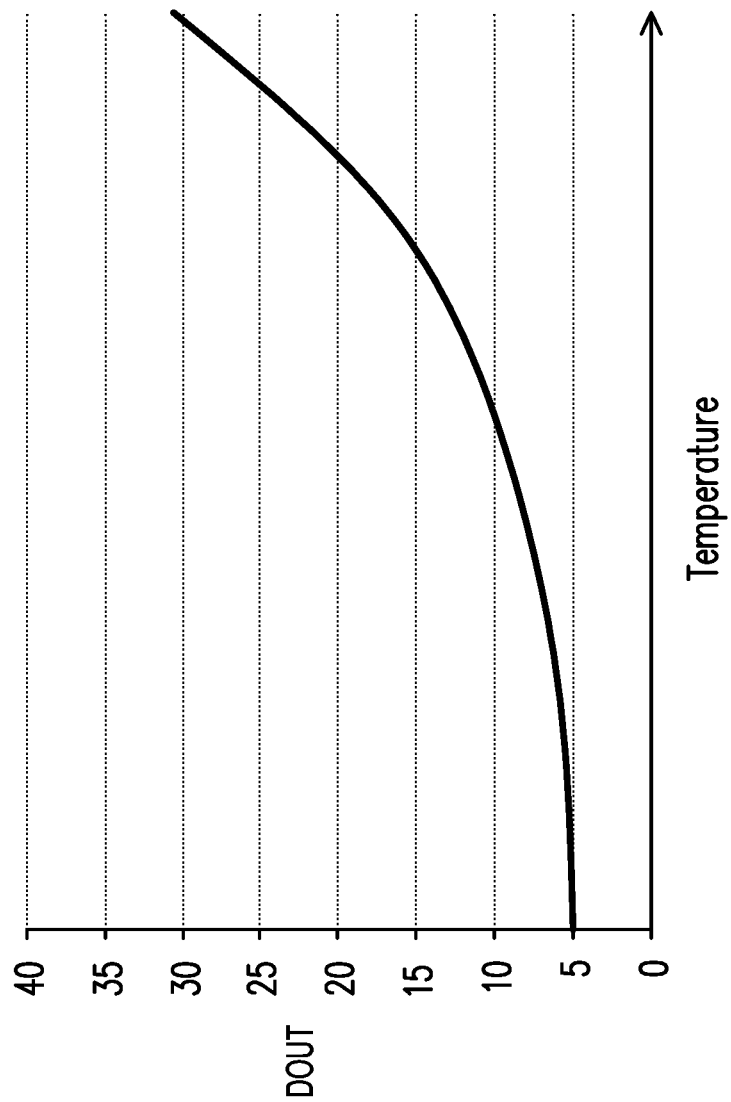
FIG. 7 is a relationship chart of output digital code values and temperature values according to one embodiment of the disclosure.

With reference to FIG. 5, FIG. 6, and FIG. 7 together, FIG. 5 is a schematic device diagram of a temperature sensing device according to Embodiment 3 of the disclosure. FIG. 6 is a relationship chart of quotient values and temperature values according to one embodiment of the disclosure. FIG. 7 is a relationship chart of output digital code values and temperature values according to one embodiment of the disclosure. In the present embodiment, a temperature sensing device 300 includes a sensor 110 and an analog-to-digital converter 320. The analog-to-digital converter 320 includes a lookup table 322. In the present embodiment, the first condition is not the same as the second condition, such that the variation amount of the first sensing result VSEN1 is greater than the variation amount of the second sensing result VSEN2. Therefore, the analog-to-digital converter 320 divides the first sensing result VSEN1 by the second sensing result VSEN2 to generate a quotient value Q. Therefore, in the relationship chart illustrated in FIG. 6, when the temperature (i.e., the ambient temperature) increases, the quotient value Q decreases. However, the disclosure is not limited thereto. In some embodiments, the analog-to-digital converter 320 may divide the second sensing result VSEN2 by the first sensing result VSEN1 to generate a quotient value Q. Therefore, in the relationship chart illustrated in FIG. 6, when the temperature (i.e., the ambient temperature) increases, the quotient value Q also increases.

The analog-to-digital converter 320 may generate an output digital code value DOUT according to the quotient value Q and the lookup table 322. In the present embodiment, the relationship between the quotient values Q and the temperature values (for example, FIG. 6) and the relationship between temperature values and the output digital code values DOUT (for example, FIG. 7) may be used as the lookup table 322. In other words, the lookup table 322 records the temperature values corresponding to the quotient values Q and also records the output digital code values DOUT corresponding to the temperature values. Therefore, the analog-to-digital converter 320 may generate the temperature value according to the quotient value Q and the lookup table 322, and generate the output digital code value DOUT according to the temperature value and the lookup table 322.

In order to ensure that the trend illustrated in FIG. 6 is monotonic and to improve the sensing resolution, the number of bits of the analog-to-digital converter 320 is required to be greater than 12. For example, the analog-to-digital converter 320 may output a 16-bit output digital code value DOUT.

In some embodiments, the analog-to-digital converter 320 further includes an operation unit (operation unit 221 in Embodiment 2). In these embodiments, the analog-to-digital converter 320 is able to obtain a quotient value Q through the above formula (1) to formula (3).

Figure 8:
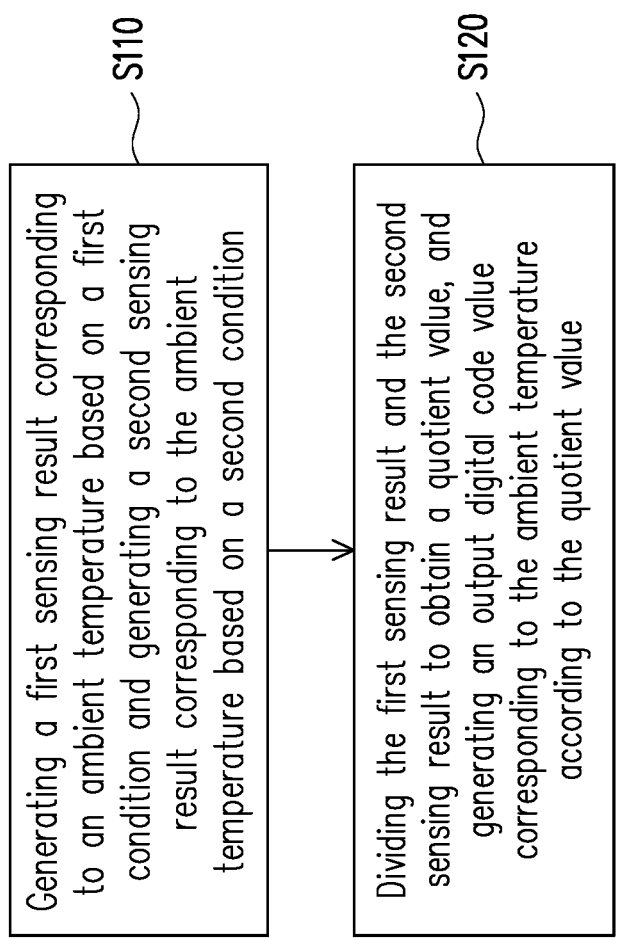
FIG. 8 is a flowchart of a temperature sensing method according to one embodiment of the disclosure.

With reference to FIG. 1 and FIG. 8 together, FIG. 8 is a flowchart of a temperature sensing method according to one embodiment of the disclosure. In step S110, a first sensing result VSEN1 corresponding to an ambient temperature is generated based on a first condition and a second sensing result VSEN2 corresponding to the ambient temperature is generated based on a second condition. In step S120, the first sensing result VSEN1 and the second sensing result VSEN2 are divided to obtain a quotient value Q, and an output digital code value DOUT corresponding to the ambient temperature is generated according to the quotient value Q. Step S120 may be executed by an analog-to-digital converter 120. It should be understood that the flow of the temperature sensing method in FIG. 8 may also be applied to the temperature sensing device 200 according to Embodiment 2 and the temperature sensing device 300 according to Embodiment 3. The implementation details of step S110 and step S120 may be sufficiently taught in a plurality of embodiments in FIG. 1 to FIG. 7 and are not repeated herein.

To sum up, in the temperature sensing device and the temperature sensing method provided by the disclosure, the sensor generates the first sensing result corresponding to the ambient temperature based on the first condition and generates the second sensing result corresponding to the ambient temperature based on the second condition. Since the first sensing result is different from the second sensing result, the voltage variation of the power source may be eliminated through a division operation to improve the temperature sensing accuracy in the disclosure. In addition, no additional temperature correction means is needed in the disclosure. Therefore, the design complexity of the temperature sensing device may be decreased.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A temperature sensing device, comprising:
    a sensor configured to generate a first analog sensing result corresponding to an ambient temperature based on a first condition and generate a second analog sensing result corresponding to the ambient temperature based on a second condition different from the first condition, wherein the first analog sensing result is different from the second analog sensing result; and
    an analog-to-digital converter coupled to the sensor and configured to convert the first analog sensing result and the second analog sensing result to an output digital code value corresponding to the ambient temperature, wherein the analog-to-digital converter comprises:
        an operation unit coupled to the sensor and configured to convert the first analog sensing result to a first digital code value, convert the second analog sensing result to a second digital code value, and divide one of the first digital code value and the second digital code value by another of the first digital code value and the second digital code value to obtain a quotient value,
    wherein the analog-to-digital converter generate the output digital code value according to the quotient value.

2. The temperature sensing device according to claim 1, wherein the analog-to-digital converter comprises:
    a lookup table configured to record the output digital code value corresponding to the quotient value,
    wherein the analog-to-digital converter generates the output digital code value according to the quotient value and the lookup table.

3. The temperature sensing device according to claim 2, wherein the analog-to-digital converter generates a temperature value according to the quotient value and the lookup table and generates the output digital code value according to the temperature value and the lookup table.

4. The temperature sensing device according to claim 1, wherein
    the sensor comprises:
        a first current source;
        a first bipolar transistor, wherein a base of the first bipolar transistor is coupled to a collector of the first bipolar transistor, the analog-to-digital converter, and the first current source, and an emitter of the first bipolar transistor is coupled to a reference low potential;
        a second current source; and
        a plurality of second bipolar transistors connected in parallel to each other, wherein bases of the plurality of second bipolar transistors are respectively coupled to collector of the plurality of second bipolar transistors, the analog-to-digital converter, and the second current source, and emitters of the plurality of second bipolar transistors are respectively coupled to the reference low potential.

5. The temperature sensing device according to claim 4, wherein a current value provided by the first current source is greater than a current value provided by the second current source.

6. The temperature sensing device according to claim 1, wherein the analog-to-digital converter is an M-bit analog-to-digital converter, and M is greater than 12.

7. A temperature sensing method, comprising:
    generating a first sensing result corresponding to an ambient temperature based on a first condition and generating a second sensing result corresponding to the ambient temperature based on a second condition different from the first condition, wherein the first sensing result is different from the second sensing result; and
    dividing one of the first sensing result and the second sensing result by another of the first sensing result and the second sensing result to obtain a quotient value and generating an output digital code value corresponding to the ambient temperature according to the quotient value.

8. The temperature sensing method according to claim 7, wherein the step of dividing one of the first sensing result and the second sensing result by another of the first sensing result and the second sensing result to obtain the quotient value comprises:
    converting the first sensing result to a first digital code value, converting the second sensing result to a second digital code value, and dividing one of the first digital code value and the second digital code value by another of the first digital code value and the second digital code value to obtain the quotient value.

9. The temperature sensing method according to claim 7, wherein the step of generating the output digital code value corresponding to the ambient temperature according to the quotient value comprises:
   providing a lookup table configured to record the output digital code value corresponding to the quotient value; and
   generating the output digital code value according to the quotient value and the lookup table.

10. The temperature sensing method according to claim 9, wherein the step of generating the output digital code value according to the quotient value and the lookup table comprises:
   generating a temperature value according to the quotient value and the lookup table and generating the output digital code value according to the temperature value and the lookup table.

\* \* \* \* \*